(12) United States Patent
Uehara et al.

(10) Patent No.: US 9,555,724 B2
(45) Date of Patent: Jan. 31, 2017

(54) VEHICLE SEAT (75) Inventors: Shinji Uehara, Yokohama (JP);
Tadanori Hisamoto, Yokohama (JP);
Masumi Yoda, Yokohama (JP);
Tsunekazu Kanno, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 68 days.

(21) Appl. No.: 14/349,309

(22) PCT Filed: Sep. 6, 2012

(86) PCT No.: PCT/JP2012/072797
§ 371 (c)(1),
(2), (4) Date: Apr. 2, 2014

(87) PCT Pub. No.: WO2013/051364
PCT Pub. Date: Apr. 11, 2013

(65) Prior Publication Data
US 2014/0265504 A1 Sep. 18, 2014

(30) Foreign Application Priority Data
Oct. 5, 2011 (JP) ................. 2011-221394

(51) Int. Cl.
*A47C 7/02* (2006.01)
*B60N 2/20* (2006.01)
(Continued)

(52) U.S. Cl.
CPC . *B60N 2/20* (2013.01); *B60N 2/06* (2013.01); *B60N 2/22* (2013.01); *B60N 2/4802* (2013.01);
(Continued)

(58) Field of Classification Search
CPC ......... A47C 7/425; A47C 7/405; A47C 7/402; B60N 2/22; B60N 2/70; A47D 1/004
(Continued)

(56) References Cited

U.S. PATENT DOCUMENTS 3,972,565 A * 8/1976 Smith .................. 297/452.48
4,401,343 A * 8/1983 Schmidt ................ 297/284.1
(Continued)

FOREIGN PATENT DOCUMENTS

| JP | 59-101842 | 7/1984 |
|---|---|---|
| JP | 1-177948 | 12/1989 |

(Continued)

OTHER PUBLICATIONS

Notice of Reasons for Rejection mailed Mar. 31, 2015 in corresponding Japanese Application No. 2011-221394.
(Continued)

*Primary Examiner* — David R Dunn
*Assistant Examiner* — Alexander Harrison
(74) *Attorney, Agent, or Firm* — Knobbe Martens Olson & Bear LLP (57) ABSTRACT

A favorable appearance can be achieved using a simple configuration, even when the configuration is provided with a back shell that moves up and down relative to a back frame. In a vehicle seat 10, the back of a seated person is adapted to be supported by a movable back shell 42 that is supported so as to be capable of moving in an up-down direction relative to a back frame 30. A non-movable back shell 46 that is attached so as to be incapable of displacement relative to the back frame 30 is disposed on a back face side of the movable back shell 42, and the back frame 30 is covered by the non-movable back shell 46.

4 Claims, 4 Drawing Sheets (51) Int. Cl.
  *B60N 2/64*     (2006.01)
  *B60N 2/22*     (2006.01)
  *B60N 2/06*     (2006.01)
  *B60N 2/48*     (2006.01)
  *B60N 2/50*     (2006.01)
  *B60N 2/70*     (2006.01)

(52) U.S. Cl.
  CPC ............... *B60N 2/502* (2013.01); *B60N 2/507* (2013.01); *B60N 2/64* (2013.01); *B60N 2/643* (2013.01); *B60N 2/70* (2013.01); *B60N 2205/30* (2013.01)

(58) Field of Classification Search
  USPC ............... 297/230.14, 230.11, 230.1, 284.3, 297/354.12, 353, 338, 452.48
  See application file for complete search history.

(56) References Cited

U.S. PATENT DOCUMENTS

| | | | |
|---|---|---|---|
| 4,676,550 A * | 6/1987 | Neve De Mevergnies | 297/353 |
| 4,773,703 A * | 9/1988 | Krugener et al. | 297/284.1 |
| 4,793,653 A * | 12/1988 | Kanazawa | 297/354.12 |
| 5,120,109 A * | 6/1992 | Rangoni | 297/284.3 |
| 5,533,787 A * | 7/1996 | Xiang | 297/284.5 |
| 5,611,596 A * | 3/1997 | Barley et al. | 297/256.13 |
| 5,909,926 A * | 6/1999 | Gonzalez | 297/354.12 |
| 6,669,294 B2 * | 12/2003 | Kinoshita et al. | 297/354.1 |
| 7,104,607 B2 * | 9/2006 | Yasuda et al. | 297/354.1 |
| 7,131,697 B2 * | 11/2006 | Beermann et al. | 297/354.12 |
| 7,134,729 B2 * | 11/2006 | Dowty et al. | 297/452.18 |
| 7,156,462 B2 * | 1/2007 | Verny et al. | 297/354.13 |
| 7,273,255 B2 * | 9/2007 | Nylander et al. | 297/338 |
| 7,780,230 B2 * | 8/2010 | Serber | 297/216.15 |
| 7,954,897 B2 * | 6/2011 | Kidokoro et al. | 297/353 |
| 2002/0060485 A1 * | 5/2002 | Fischer et al. | 297/284.4 |
| 2005/0017560 A1 * | 1/2005 | Bastas | 297/353 |
| 2005/0151405 A1 * | 7/2005 | Dowty et al. | 297/317 |
| 2006/0076816 A1 * | 4/2006 | Fujita et al. | 297/362.12 |
| 2006/0103211 A1 | 5/2006 | Garrido | |
| 2008/0252123 A1 * | 10/2008 | Kuno et al. | 297/284.3 |
| 2010/0171346 A1 * | 7/2010 | Laframboise et al. | 297/183.1 |
| 2012/0231203 A1 * | 9/2012 | Galbreath et al. | 428/68 |
| 2013/0207429 A1 * | 8/2013 | Hoyle | 297/338 |
| 2015/0084390 A1 * | 3/2015 | Tanaka et al. | 297/338 |

FOREIGN PATENT DOCUMENTS

| | | |
|---|---|---|
| JP | H06-72200 | 3/1994 |
| JP | 2008-526425 A | 7/2008 |
| WO | WO 2008/041040 A1 | 4/2008 |

OTHER PUBLICATIONS

Extended European Search Report issued May 4, 2015 in European Application No. 12838155.5.

\* cited by examiner

VEHICLE SEAT

CROSS-REFERENCE TO RELATED APPLICATIONS

This application is the U.S. National Phase under 35 U.S.C. §371 of International Application PCT/JP2012/072797, filed Sep. 6, 2012, which claims priority to Japanese Patent Application No. 2011-221394, filed Oct. 5, 2011. The disclosures of the above described applications are hereby incorporated by reference in their entirety. The International Application was published under PCT Article 21(2) in a language other than English.

TECHNICAL FIELD

The present invention relates to a vehicle seat, and in particular relates to a vehicle seat having a back shell that is supported so as to be movable with respect to a back frame of a seatback.

BACKGROUND ART

A vehicle seat as described in Japanese Patent Application Laid-Open (JP-A) No. 2008-526425 is provided with a back shell that is formed in a shape capable of holding the back of a seated person, and a cushion shell formed in a shape capable of holding buttocks of a seated person. The back shell is attached so as to be movable in an up-down direction and front-rear direction relative to a back frame, and the cushion shell is attached so as to be movable in the up-down direction relative to a cushion frame. The back shell and cushion shell are coupled together by a hinge, and the back shell moves up and down, tracing the up and down movement of the cushion shell. This kind of vehicle seat enables the seated person to be held comfortably by the back shell and cushion shell, and enables a comfortable ride by movement of the back shell and cushion shell to match the physique and posture of the seated person.

LIST OF PATENT DOCUMENTS

Patent Document 1: Japanese Patent Application Laid-Open (JP-A) No. 2008-526425

SUMMARY OF INVENTION

Technical Subject

However, the vehicle seat such as described above employs a configuration wherein the back shell moves up and down relative to the back frame, thereby making it difficult to completely cover and hide frame members such as the back frame by the back shell (the movable member) alone, so that countermeasures are required in order to create a favorable appearance.

In consideration of the above circumstances, a subject of the present invention is to achieve a vehicle seat that has a favorable appearance using a simple configuration, even when the configuration is provided with a back shell that moves up and down relative to a back frame.

Solution Addressing to Subject

A vehicle seat according to a first aspect of the present invention is provided with: a back frame that configures a seatback frame; a cushion frame that configures a seat cushion frame; a movable back shell that is supported so as to be capable of at least moving in the up-down direction relative to the back frame, and that is adapted to be capable of supporting the back of a seated person; a cushion shell that is supported so as to be capable of moving in the up-down direction relative to the cushion frame and that is adapted to be capable of supporting the buttocks and thighs of the seated person; a hinge that couples together a lower end portion of the movable back shell and a rear end portion of the cushion shell so as to be capable of turning about an axis running along the seat width direction; and a non-movable back shell that is disposed on a back face side of the movable back shell, that covers the back frame, wherein at least both end sides in a seat width direction of the non-movable back shell extend further to an outside than an outer periphery of the movable back shell when viewed from a front side of a seatback.

In the first aspect, the back of the seated person is supported by the movable back shell that is supported so as to be capable of at least moving in the up-down direction relative to the back frame. The non-movable back shell is disposed on the back face side of the movable back shell, and the non-movable back shell covers the back frame. This enables a favorable appearance to be achieved using a simple configuration, even when the configuration is provided with a movable back shell that moves up and down relative to the back frame.

In the aspect of the present invention, at least both end sides in the seat width direction of the non-movable back shell disposed on the back face side of the movable back shell extend further to the outside than the outer periphery of the movable back shell when viewed from the front side of the seatback. As a result, the dimensional relationship (distance) between the vehicle seat and other vehicle parts remains unchanged appropriately even when the movable back shell moves up and down. Moreover, there is no need to arrange a portion at outside of the non-movable back shell that covers relative movement of the movable back shell relative to the non-movable back shell, enabling the flexibility for the seatback outer periphery shape to be improved, and enabling the flexibility for design to be increased.

A vehicle seat according to a third aspect of the present invention is the vehicle seat of the first aspect, wherein the non-movable back shell is configured including a pad member mounted to the back frame.

In the third aspect of the present invention, the non-movable back shell is configured including the pad member mounted to the back frame, thereby enabling the non-movable back shell to be configured lightweight and at low cost.

Advantageous Effects of Invention

As described above, a vehicle seat according to the present invention enables a favorable appearance to be achieved using a simple configuration, even when the configuration is provided with a back shell that moves up and down relative to a back frame.

DESCRIPTION OF EMBODIMENTS

Explanation follows regarding a vehicle seat 10 according to an exemplary embodiment of the present invention, with reference to FIG. 1 to FIG. 4. Note that in each of the drawings, the arrow FR indicates the vehicle front direction, the arrow UP indicates the vehicle upwards direction, and the arrow W indicates the vehicle width direction (the vehicle left-right direction) as appropriate. Furthermore, the front, rear, left, right, up, and down directions of the vehicle seat 10 in the present exemplary embodiment respectively correspond to the front, rear, left, right, up, and down directions of the vehicle.

Figure 1:
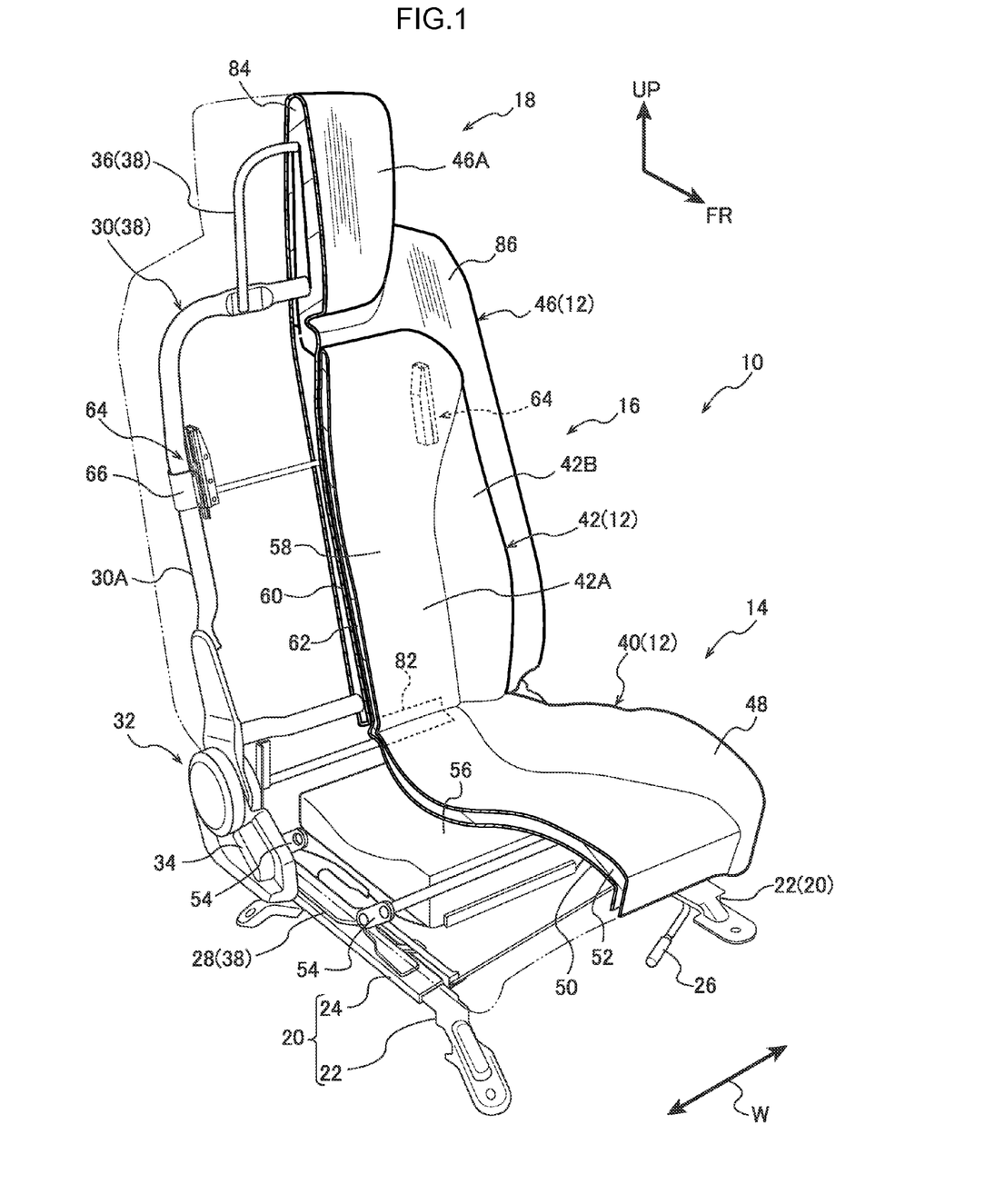
FIG. 1 is a perspective view illustrating a configuration of a relevant portion of a vehicle seat according to an exemplary embodiment of the present invention, and in the drawing, a seat shell that is a component member of the vehicle seat is cut into two in the seat width direction and one side only is shown.
Figure 2:
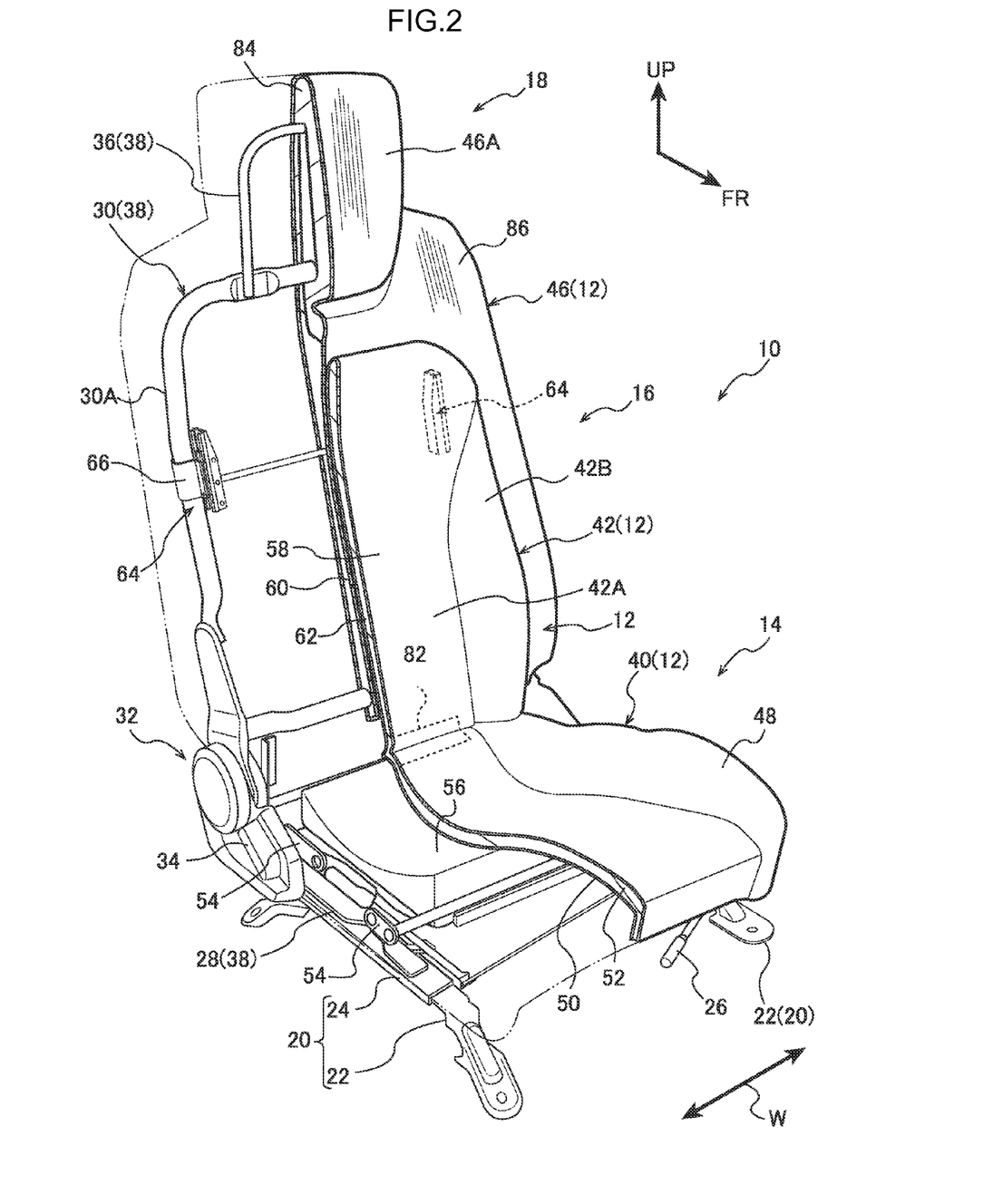
FIG. 2 is a perspective view corresponding to FIG. 1, illustrating a state wherein the seat shell is lowered relative to a seat frame.

As illustrated in FIG. 1 and FIG. 2, the vehicle seat 10 of the present exemplary embodiment is a shell type seat wherein a seat shell 12 supports a seated person (occupant). The vehicle seat 10 is provided with a seat cushion 14 supporting the buttocks and thighs of the seated person, a seatback 16 supporting the back of the seated person, and a headrest 18 supporting the head of the seated person.

The seat cushion 14 is coupled to a vehicle body floor through a slide mechanism that is configured including a pair of left and right slide rails 20. The slide rails 20 each include a lower rail 22 fixed to the vehicle body floor and an upper rail 24 that is attached to the lower rail 22. The lower rail 22 and upper rail 24 are formed in an elongated shape running along the vehicle front-rear direction, and the upper rail 24 is supported so as to be capable of sliding in the vehicle front-rear direction relative to the lower rail 22. Sliding of the upper rail 24 with respect to the lower rail 22 is restricted by a lock mechanism, not illustrated in the drawings, and sliding of the upper rail 24 with respect to the lower rail 22 is permitted by operation of a lock release lever 26.

A cushion frame 28 (see FIG. 3) that configures framework of the seat cushion 14 spans between the left and right upper rails 24. The cushion frame 28 is configured from sheet metal material and both end portions in the seat width direction of the cushion frame 28 are fixed to upper faces of the left and right upper rails 24. A back frame 30 that configures framework of the seatback 16 is reclinably coupled through a reclining mechanism 32 to rear end portions of the left and right upper rails 24. The back frame 30 is configured by a pipe member, and is formed substantially in a frame shape when viewed along the seat front-rear direction. Reclining of the back frame 30 with respect to the cushion frame 28 is restricted by a lock mechanism provided to the reclining mechanism 32. Reclining of the back frame 30 with respect to the cushion frame 28 is permitted by operation of a lock release lever 34.

A headrest frame 36 that configures framework of the headrest 18 is provided above the back frame 30. The headrest frame 36 is configured by a pipe member, and is formed in an inverted U shape when viewed along the seat front-rear direction. Lower end portions of the headrest frame 36 are fixed to an upper end portion of the back frame 30 by means such as welding. A seat frame 38, that is a framework member of the vehicle seat 10, is configured by the headrest frame 36, the back frame 30 and the cushion frame 28. In the present exemplary embodiment, as described above, the cushion frame 28 is configured by a sheet metal material and the back frame 30 and the headrest frame 36 are configured by pipe members, however the materials for each frame are not limited to the above, and may be changed as appropriate.

The seat shell 12 is attached to the seat frame 38 described above. The seat shell 12 is configured by: a cushion shell 40 that is supported so as to be movable in the up-down direction with respect to the cushion frame 28; a movable back shell 42 (a movable member) that is movable in the up-down direction with respect to the back frame 30 and supported so as to be capable of turning about an axis running along the seat width direction; and a non-movable back shell 46 (a non-movable member) that is attached to the back frame 30 so as to be incapable of displacement and that covers the back frame 30.

Figure 3:
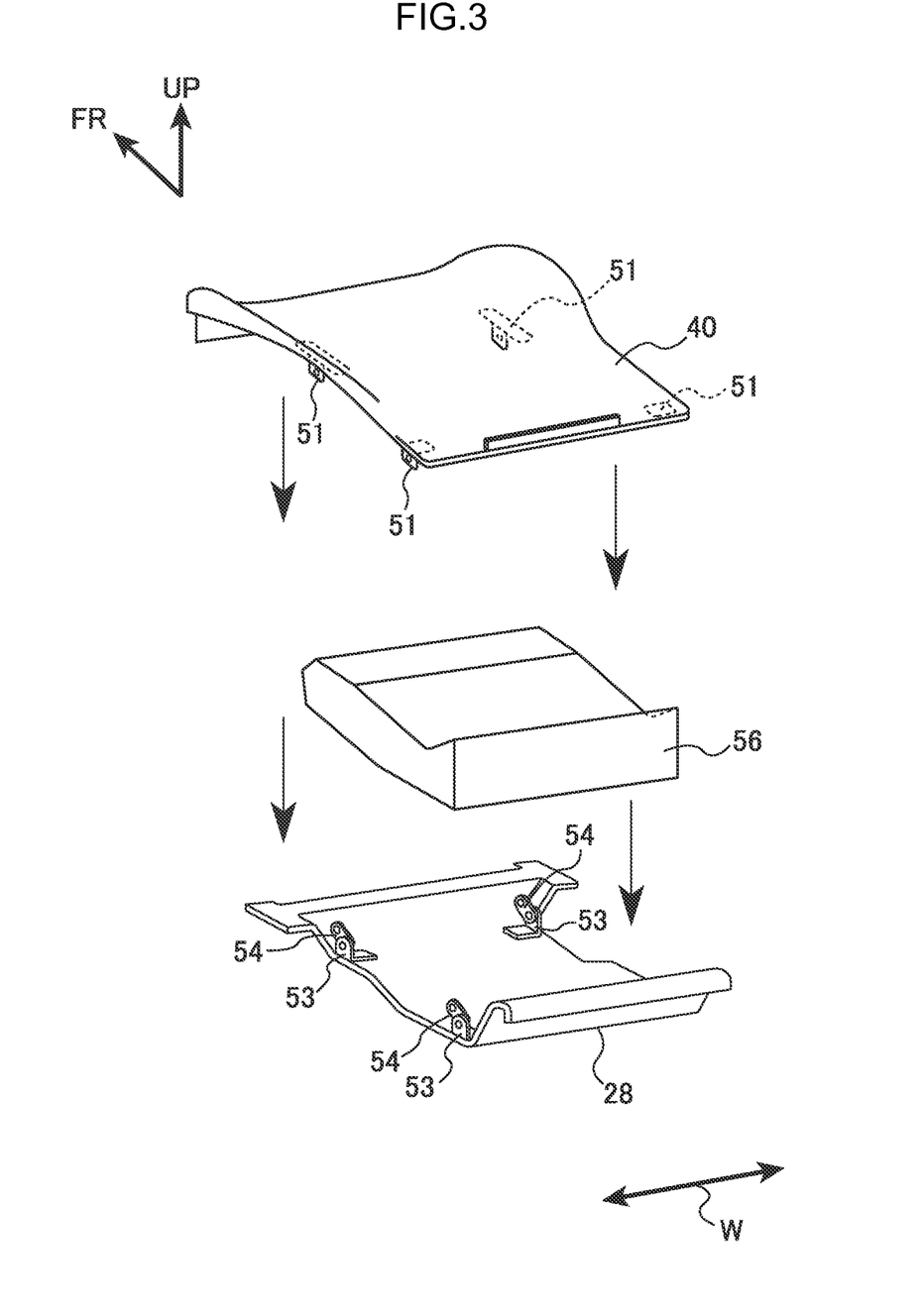
FIG. 3 is a schematic, exploded perspective drawing illustrating configuration of a cushion shell, a support pad and a cushion frame that are component members of the vehicle seat.

The cushion shell 40 includes an outside shell 48 and an inside shell 50 formed by a rigid synthetic resin material. A thin pad member 52 formed by a foam body such as a urethane pad is interposed between the outside shell 48 and the inside shell 50. An upper face (front face of the outside shell 48) of the cushion shell 40 is formed so as to follow the shape of the buttocks and thighs of the seated person such that the buttocks and thighs of the seated person can be held comfortably. As illustrated in FIG. 3, four attachment tabs 51 are fixed to a lower face of the cushion shell 40 (a lower face of the inside shell). Note that the cushion shell 40 is shown schematically in FIG. 3.

The cushion shell 40 described above is disposed above the cushion frame 28. Four attachment tabs 53 that correspond to the four attachment tabs 51 are fixed to an upper face of the cushion frame 28. Each of the attachment tabs 51, 53 are respectively coupled together by links 54. The links 54 configure a parallel link mechanism, and the cushion shell 40 is supported so as to be capable of moving in the up-down direction within a specific range with respect to the cushion frame 28. Note that a configuration employing a cross link mechanism may be used instead of the parallel link mechanism.

A support pad 56 formed by a foam body such as a urethane pad is interposed between the cushion shell 40 and the cushion frame 28. A lower face of the support pad 56 is in contact with an upper face of the cushion frame 28, and an upper face of support pad 56 is in contact with a lower face of the cushion shell 40 (a lower face of the inside shell 50). The support pad 56 retains the cushion shell 40 at an upper end side of the movement range of the cushion shell 40 with respect to the cushion frame 28. The cushion shell 40 moves downwards due to resilient deformation of the support pad 56 when a person sits on the cushion shell 40. Moreover, a comfortable ride for the seated person can be secured by resilient deformation of the support pad 56 in response to vehicle vibrations during vehicle travel. Note that the support pad 56 is not limited to being formed by a foam body and may be configured for example by a metal spring, a pneumatic spring or a hydraulic cushion.

The movable back shell 42 includes an outside shell 58 and an inside shell 60 that are formed by a rigid synthetic resin material. A thin pad member 62 formed by a foam body such as a urethane pad is interposed between the outside shell 58 and the inside shell 60. A front face of the movable back shell 42 (the top surface of the outside shell 58) is formed so as to follow the shape of the back of the seated person, such that the back of the seated person can be held comfortably. Specifically, a center portion in the seat width direction of the movable back shell 42 configures a main body portion 42A that contacts the back of the seated person, and both end sides in the seat width direction of the movable back shell 42 configure side support portions 42B that bulge out further towards the front side of the seat than the main body portion 42A. Configuration is made such that the seated person is supported from the sides by the side support portions 42B.

Note that the materials for the outside shells 48, 58 and the inside shells 50, 60 are not limited to rigid synthetic resin materials, and light alloy materials of for example aluminum, FRP, wood and the like may also be used.

Figure 4:
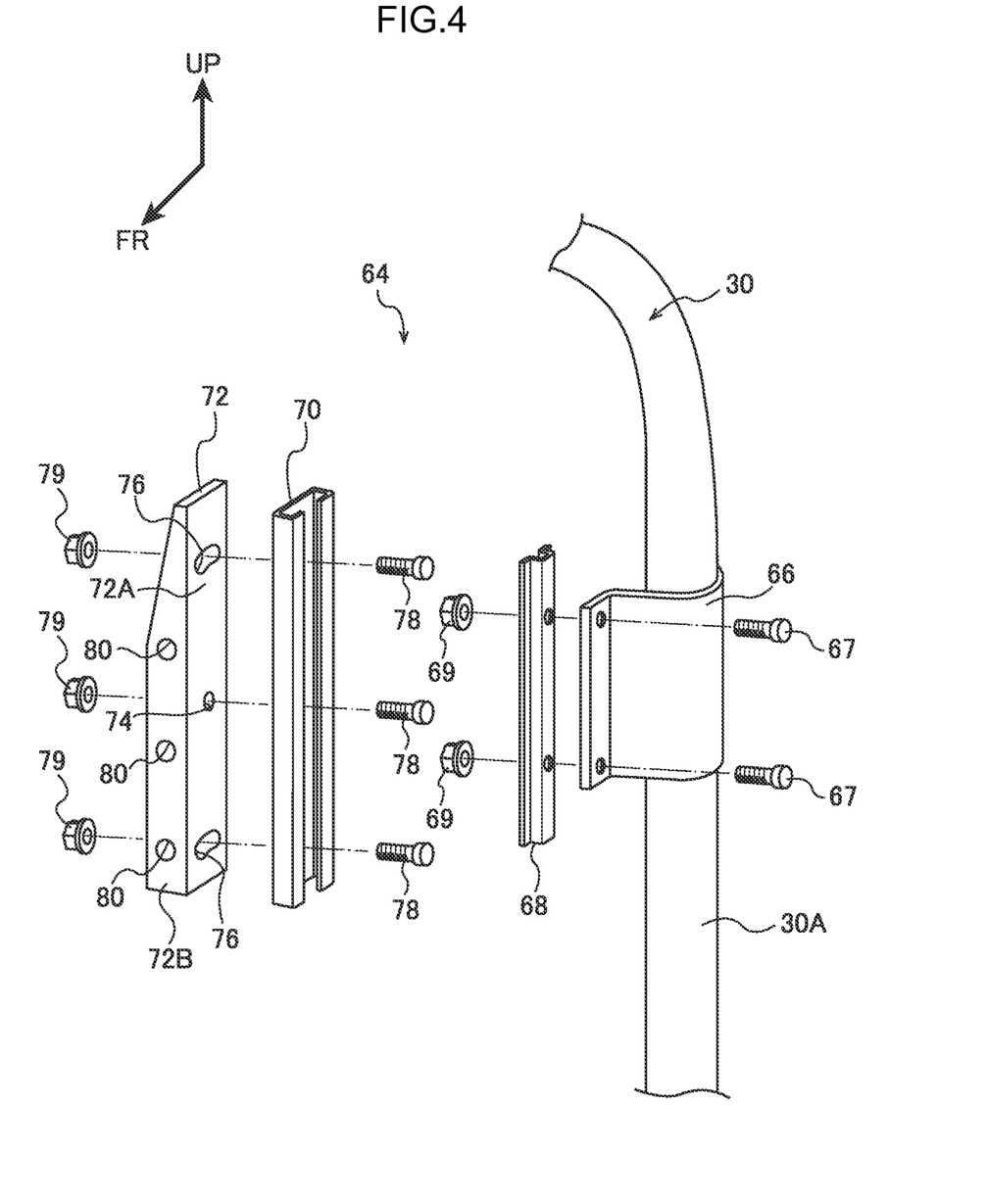
FIG. 4 is an exploded perspective view illustrating a configuration of a back shell support mechanism that is a component member of the vehicle seat.

The movable back shell 42 described above is disposed at a front side of the seatback with respect to the back frame 30, and is supported at the back frame 30 through a pair of left and right back shell support mechanisms 64. The back shell support mechanisms 64 couple the movable back shell 42 to the back frame 30 such that the movable back shell 42 can move in the up-down direction and turn about an axis running along the seat width direction. As illustrated in FIG. 4, each back shell support mechanism 64 is configured by an attachment member 66, a slide rail 68, a slider 70 and an attachment plate 72.

Each attachment member 66 is formed by for example a sheet metal material, and is fixed to a side frame 30A of the back frame 30 by means such as welding. The attachment member 66 is configured so as to absorb energy by undergoing plastic deformation in the event of a vehicle rear-end collision or the like. The slide rail 68 is fixed to the attachment member 66 by bolts 67 and nuts 69. The slide rail 68 is an elongated member with a hat-shaped cross-section and is disposed in a state wherein the length direction runs along the seatback height direction. The slider 70 is attached to the slide rail 68. The slider 70 is an elongated member with a substantially C-shaped cross-section, inside which the slide rail 68 fitted so as to be capable of sliding. The slider 70 is thereby slidable in the seatback height direction with respect to the slide rail 68.

The attachment plate 72 is coupled to the slider 70 described above. The attachment plate 72 is an elongated, block shaped member, disposed in a state wherein the length direction runs along the seatback height direction. The attachment plate 72 includes a first attachment face 72A facing the slider 70 and a second attachment face 72B facing a back face of the movable back shell 42. A circular shaped bolt hole 74 is formed at the center of the first attachment face 72A, and oval shaped elongated holes 76 are respectively formed above and below the bolt hole 74. The bolt hole 74 and the elongated holes 76 penetrate the attachment plate 72 in the seat width direction.

Bolts 78 pass through the slider 70 at three locations from top to bottom. The center bolt 78 passes through the bolt hole 74 at the center of the attachment plate 72 and is screwed together with a nut 79. The attachment plate 72 is thereby coupled to the slider 70 so as to be capable of rotating about the center bolt 78 (about an axis running along the seat width direction). Upper and lower bolts 78 are respectively passed though the upper and lower elongated holes 76 and screwed together with nuts 79. The turning range of the attachment plate 72 with respect to the slider 70 is thereby limited to within the range of the elongated holes 76.

Plural bolt holes 80 that pass through the attachment plate 72 in the seatback front-rear direction and open onto the second attachment face 72B are formed to the attachment plate 72. The attachment plate 72 is bolted to the back face of the movable back shell 42 by bolts, not shown in the drawings, that are inserted through the bolt holes 80. The movable back shell 42 is thereby coupled to the back frame 30 through the back shell support mechanisms 64. Sliding of the sliders 70 with respect to the slide rails 68 in the back shell support mechanisms 64 permits relative movement in the up-down direction (up-down movement) of the movable back shell 42 with respect to the back frame 30, and also permits turning of the movable back shell 42 with respect to the back frame 30 due to turning of the attachment plate 72 with respect to the slider 70.

Note that configuration of the back shell support mechanism that couples the movable back shell 42 to the back frame 30 is not limited to that described above, and various changes may be made. For example, a slide mechanism and a cross link mechanism may be combined to configure a mechanism that couples the back shell 42 to the back frame 30 so as to enable movement in the up-down direction and the front-rear direction.

A lower end portion of the movable back shell 42 that is supported at the back frame 30 as described above is coupled to a rear end portion of the cushion shell 40 through a hinge 82. The movable back shell 42 is thereby coupled to the cushion shell 40 so as to be capable of turning about the hinge 82 (about an axis running along the seat width direction). Up-down movement of the cushion shell 40 is thereby accompanied by up-down movement of the movable back shell 42. Moreover, when this occurs, the angle of inclination of the movable back shell 42 changes appropriately to suit the posture of the seated person. Note that FIG. 1 illustrates a state wherein the cushion shell 40 and the movable back shell 42 are disposed at an upper end side of the up-down direction movement range, and FIG. 2 illustrates a state wherein the cushion shell 40 and the movable back shell 42 are disposed at a lower end side of the up-down direction movement range.

The non-movable back shell 46 is disposed at a back face side of the movable back shell 42 described above. The non-movable back shell 46 is formed by a pad member 84 that is mounted to the back frame 30 and an outer cover member 86 that covers the pad member 84. The pad member 84 is made by a foam body such as a urethane foam The non-movable back shell 46 is attached to the back frame 30 so as to be incapable of displacement, and covers the back frame 30 from the outside. Note that through holes are formed in the outer cover member 86 at locations facing the back shell support mechanisms 64, with the through holes covered by the movable back shell 42. There is no particular limitation to the material for the outer cover member 86 and for example a fabric, a synthetic resin material, a light alloy material of for example aluminum, FRP or wood may be employed.

The non-movable back shell 46 includes an integral headrest portion 46A, and the headrest frame 36 is covered by the headrest portion 46A. In other words, in the present exemplary embodiment, the external shape of portion of the seatback 16 that support the back of the seated person is configured by the movable back shell 42, and the external shape of other portions of the seatback 16 and the external shape of the headrest 18 are configured by the non-movable back shell 46.

The non-movable back shell 46 is formed so as to be larger than the movable back shell 42, with an upper end side and both end sides in the seat width direction of the non-movable back shell 46 projecting out further towards the outside than the outer periphery of the movable back shell 42 as viewed from the front side of the seatback 16. Moreover, the both end sides in the seat width direction of the non-movable back shell 46 bulge out towards the front side of the seatback so as to follow the side support portions 42B of the movable back shell 42.

Next, explanation follows regarding operation and advantageous effects of the present exemplary embodiment.

In the vehicle seat 10 configured as described above, the back of the seated person is supported by the movable back shell 42 that is supported so as to be capable of movement in the up-down direction with respect to the back frame 30. The non-movable back shell 46 that is attached to the back frame 30 so as to be incapable of displacement is disposed on the back face side of the movable back shell 42, and the back frame 30 is covered by the non-movable back shell 46. Accordingly, a favorable external appearance can be achieved with a simple configuration, even in a configuration provided with the movable back shell 42 that moves up and down with respect to the back frame 30.

Note that in the vehicle seat described in the Background Art, a back frame can be prevented from being exposed to the outside by providing a cover member such as a resin cover for example at a back face side of a seatback that is not covered by a back shell, or to headrest frame insertion holes formed to an upper face of a back shell. However, such a cover member needs to be capable of covering up-down movement of the back shell, in other words, the cover member must for example be configured so as to undergo deformation following up-down movement of the back shell with respect to the back frame. Moreover, the cover member would need to be set in a wide range over for example a back face side of the seatback. There are accordingly concerns of for example an increase in manufacturing cost, and a reduction of flexibility in the layout of other components. Such a cover member is not required in the present vehicle seat 10, thereby preventing or suppressing an increase in manufacturing cost or reduction in the flexibility in the layout of other components, as well as enabling an increase in flexibility for design.

The non-movable back shell 46 disposed on the back face side of the movable back shell 42 of the present vehicle seat 10 is formed so as to be larger than the movable back shell 42, with the upper end side and both end sides in the seat width direction of the non-movable back shell 46 projecting out further towards the outside than the outer periphery of the movable back shell 42 as viewed from the front side of the seatback 16. Accordingly, a preferable dimensional relationship (distance) remains unchanged between the vehicle seat 10 and other vehicle components even with up-down movement of the movable back shell 42. Moreover, it is not necessary to arrange a portion at the outside of the non-movable back shell 46 that covers relative movement of the movable back shell 42 with respect to the non-movable back shell 46, thereby enabling an increase in the flexibility for the external shape of the seatback 16, and an increase in the flexibility for design.

The non-movable back shell 46 of the vehicle seat 10 is configured including the pad member 84 that is formed from a foam body such as urethane foam and is mounted to the back frame 30. A lightweight and inexpensive configuration can accordingly be achieved for the non-movable back shell 46. Moreover, the non-movable back shell 46 is configured including the pad member 84, and can therefore be made soft to the touch for the occupant, enabling the comfort of the occupant to be increased.

Both end sides in the seat width direction of the non-movable back shell 46 of the vehicle seat 10 bulge out towards the front side of the seatback following the side support portions 42B of the movable back shell 42. The movable back shell 42 and the non-movable back shell 46 thereby present a unified external look, enabling an excellent appearance to be achieved for the seatback 16.

The non-movable back shell 46 of the vehicle seat 10 is integrally provided with the headrest portion 46A that covers the headrest frame 36, enabling a reduction in the number of components and a reduction in cost of the vehicle seat 10.

Supplementary Explanation of the Exemplary Embodiment

In the exemplary embodiment described above, the non-movable back shell 46 is configured integrally provided with the headrest portion 46A, however the invention according to claim 1 to claim 3 is not limited thereto, and in cases in which the seatback and the headrest are formed as separate bodies, the non-movable back shell is configured with the headrest portion omitted.

In the exemplary embodiment described above, explanation is given wherein the non-movable back shell 46 is configured including the pad member 84, however the invention according to claim 1 and claim 2 is not limited thereto, and the configuration of the non-movable back shell may be modified as appropriate.

In the exemplary embodiment described above, the movable back shell 42 is supported so as to be capable of up-down movement and so as to be capable of turning about an axis running along the seat width direction with respect to the back frame 30, however the invention according to claim 1 is not limited thereto, and it is sufficient for the movable back shell 42 to be supported so as to be movable in at least the up-down direction with respect to the back frame 30.

Various other modifications may be implemented within a range not departing from the spirit of the present invention. It goes without saying that the scope of rights encompassed by the present invention is not limited by the exemplary embodiment described above.

EXPLANATION OF THE REFERENCE NUMERALS

10 Vehicle seat
16 Seatback
30 Back frame
42 Movable back shell
46 Non-movable back shell
84 Pad member

What is claimed is:

1. A vehicle seat comprising:
a back frame that configures a seatback frame;
a cushion frame that configures a seat cushion frame;
a movable back shell that is supported so as to be capable of at least moving in the up-down direction relative to the back frame, and that is adapted to be capable of supporting the back of a seated person;
a cushion shell that is supported so as to be capable of moving in the up-down direction relative to the cushion frame and that is adapted to be capable of supporting the buttocks and thighs of the seated person;
a hinge that couples together a lower end portion of the movable back shell and a rear end portion of the cushion shell so as to be capable of turning about a first axis running along the seat width direction;
a non-movable back shell that is disposed on a back face side of the movable back shell, that covers the back frame, wherein at least both end sides in a seat width direction of the non-movable back shell extend further to an outside than an outer periphery of the movable back shell when viewed from a front side of a seatback, the movable back shell being movable in the up-down direction relative to the non-movable back shell; and a pair of left and right back shell support mechanisms coupling the movable back shell to the back frame such that the movable back shell can move in the up-down direction and turn about a second axis running along the seat width direction, wherein the cushion shell is resiliently supported by a support material that is interposed between the cushion shell and the cushion frame, and that is made of foam material, up-down movement of the cushion shell is accompanied by up-down movement of the movable back shell, each back shell support mechanism comprises:
an attachment member,
a slide rail,
a slider, and
an attachment plate,
wherein the movable back shell is attached to the slider through the attachment plate, and wherein the attachment plate is coupled to the slider so as to be rotatable about the second axis running along the seat width direction.

2. The vehicle seat of claim 1, wherein the non-movable back shell is configured including a pad member mounted to the back frame.

3. The vehicle seat of claim 1, wherein the non-movable back shell covers a back face of the movable back shell.

4. A vehicle seat comprising:
a back frame that configures a seatback frame;
a cushion frame that configures a seat cushion frame;
a movable back shell that is supported so as to be capable of at least moving in the up-down direction relative to the back frame, and that is adapted to be capable of supporting the back of a seated person;
a cushion shell that is supported so as to be capable of moving in the up-down direction relative to the cushion frame and that is adapted to be capable of supporting the buttocks and thighs of the seated person;
a hinge that couples together a lower end portion of the movable back shell and a rear end portion of the cushion shell so as to be capable of turning about an axis running along the seat width direction; and
a non-movable back shell that is disposed on a back face side of the movable back shell, that covers the back frame, wherein at least both end sides in a seat width direction of the non-movable back shell extend further to an outside than an outer periphery of the movable back shell when viewed from a front side of a seatback,
a pair of left and right back shell support mechanisms coupling the movable back shell to the back frame such that the movable back shell can move in the up-down directions and turn about a second axis running along the seat width direction,
wherein each back shell support mechanism comprises:
an attachment member,
a side rail,
a slider, and
an attachment plate,
wherein the movable back shell is attached to the slider through the attachment plate, and wherein the attachment plate is coupled to the slider so as to be rotatable about the second axis running along the seat width direction,
a circular shaped hole is formed at a center of the attachment plate and elongated shaped holes are formed at both sides of the circular shaped hole at the attachment plate, and
bolts that pass through the slider are passed through the circular shaped hole and the oval shaped holes and are coupled with nuts such that the turning range of the attachment plate with respect to the slider is limited within an opening range of the oval shaped holes.

* * * * *